(No Model.)
J. W. McPHERSON.
COMBINED FORK, PAN, AND STOVE LID LIFTER.
No. 416,736. Patented Dec. 10, 1889.
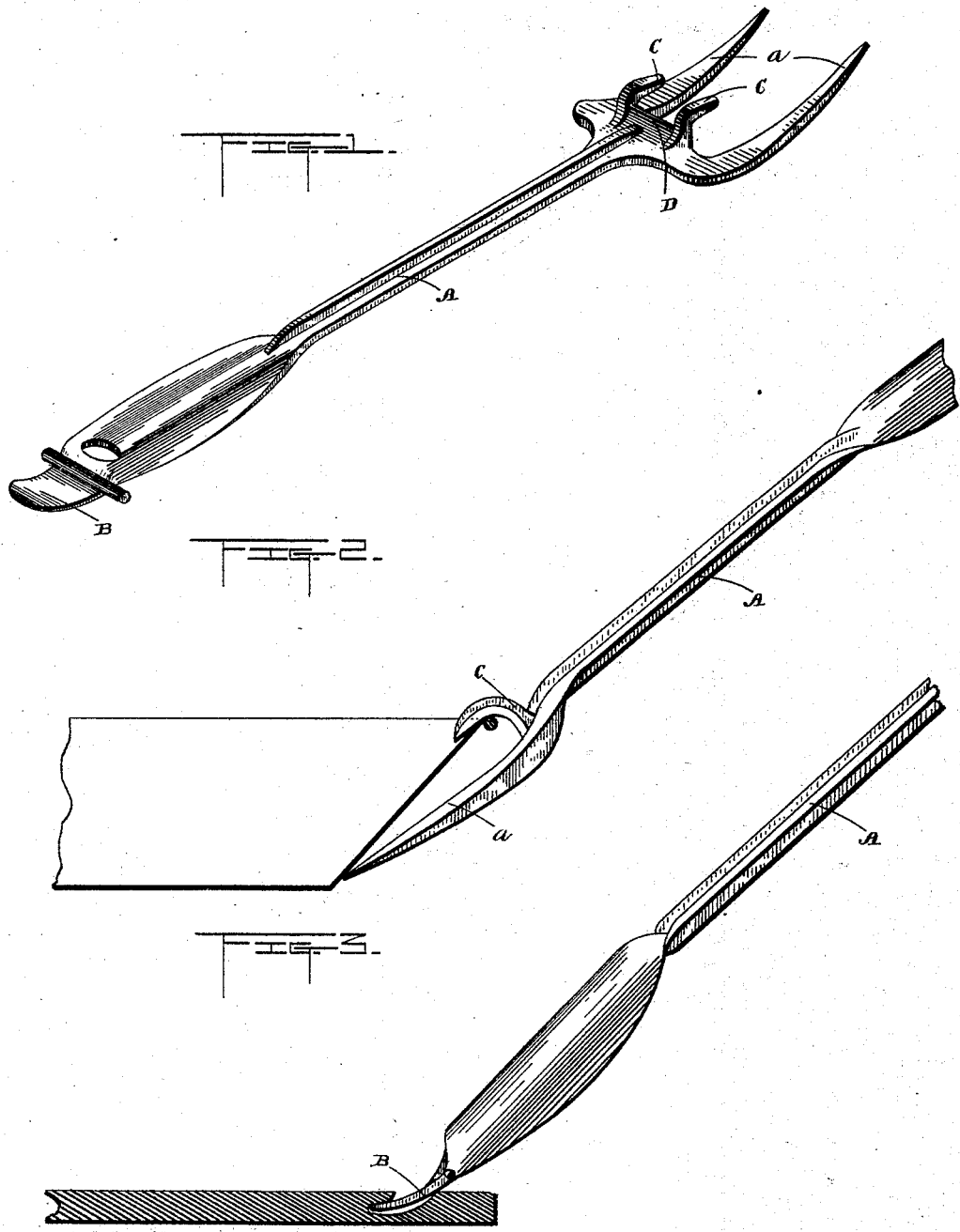
Witnesses
R. B. Seward
Benj. F. Cowl
Inventor
J. W. McPherson
By E. B. Seward
Attorney

UNITED STATES PATENT OFFICE.

JOHN W. McPHERSON, OF MOLINE, ILLINOIS.

COMBINED FORK, PAN, AND STOVE-LID LIFTER.

SPECIFICATION forming part of Letters Patent No. 416,736, dated December 10, 1889.

Application filed January 31, 1889. Serial No. 298,161. (No model.)

*To all whom it may concern:*

Be it known that I, JOHN W. MCPHERSON, of Moline, in the county of Rock Island and State of Illinois, have invented certain new and useful Improvements in a Combined Fork, Pan, and Stove-Lid Lifter; and I do hereby declare the following to be a full, clear, and exact description of the invention, such as will enable others skilled in the art to which it appertains to make and use the same.

My invention relates to an improvement in a combined fork, pan, and stove-lid lifter.

The object is to provide a combination utensil for cooking purposes which shall be light, strong, convenient, and inexpensive.

With these ends in view my invention consists in certain features of construction and combinations of parts, as will be hereinafter described, and pointed out in the claims.

In the accompanying drawings, Figure 1 represents the utensil in perspective. Fig. 2 shows its application as a pan-lifter, and Fig. 3 represents its application as a stove-lid lifter.

The utensil consists of a single casting. A represents the handle portion, the same terminating at one end in fork-tines $a$ and at the opposite end in a lid-lifting hook B. The metal which composes the handle is disposed for a considerable distance from the fork-tines in X form in cross-section for the purpose of rendering it light and stiff, while near the stove-lid hook B it is spread out into concavo-convex form in cross-section, thereby affording an extended rest for the palm of the hand when employed as a fork or pan-lifter and preventing liability of twisting within the grasp of the operator. This is an important feature, particularly when carrying a pan partially or completely filled with a substance liable to spill, as it enables it to be carried with great steadiness.

From the upper portion of the fork-head two retaining lugs or arms C project, the same being bent over at their upper ends toward the points of the fork-tines in order to engage the upper edge of the pan to be lifted.

In order that the arms C may be cast light and at the same time have sufficient strength to render them capable of lifting a heavy weight, a thin web of metal D is cast between the two arms, the said web extending halfway from the base of the arms to their curved portions, more or less. The arms C are preferably located at equal distances from and one on each side of the central longitudinal axis of the utensil, and the distance between the turned or hooked portions of the arms C and the tines is sufficient to admit freely any of the pans of ordinary thickness.

It is obvious that the combination utensil as thus described may be made of various sizes to suit the demands.

Having thus fully described my invention, what I claim as new, and desire to secure by Letters Patent, is—

1. The combination cooking utensil consisting of a handle terminating at one end in fork-tines and terminating at the opposite end in a stove-lid hook, and curved arms projecting from the fork-head over the plane of the fork-tines to engage the top edge of a pan, the whole being formed integral, substantially as set forth.

2. The combination utensil consisting of a handle portion X-shaped in cross-section terminating at one end in fork-tines spread out in concavo-convex form and terminating in a stove-lid hook at the opposite end, and a pair of arms projecting upwardly from the fork-head and turned over to engage the top edge of a pan, the whole being formed integral, substantially as set forth.

3. The combination utensil consisting of a handle terminating in a pair of fork-tines, a pair of pan-retaining arms or lugs projecting upwardly from the fork-head, and a web of metal connecting the adjacent edges of the arms, substantially as set forth.

In testimony whereof I have signed this specification in the presence of two subscribing witnesses.

JOHN W. McPHERSON.

Witnesses:
H. W. HYDE,
S. S. DAVIS.